United States Patent

[11] 3,602,384

[72] Inventor John T. Warren
 116 S. Main St., Bluffton, Ohio 45817
[21] Appl. No. 788,539
[22] Filed Jan. 2, 1969
[45] Patented Aug. 31, 1971

[54] TRAINED TRUCK-TILTABLE TRAILER VEHICLE
 7 Claims, 5 Drawing Figs.
[52] U.S. Cl. .................................................. 214/506, 280/423 B
[51] Int. Cl. .................................................. B60p 1/28
[50] Field of Search............................................ 214/505, 506, 85; 280/423 B, 425 A

[56] References Cited
UNITED STATES PATENTS

| | | | |
|---|---|---|---|
| 2,754,987 | 7/1956 | Kern | 214/505 |
| 2,789,714 | 4/1957 | Norris | 214/506 |
| 2,812,088 | 11/1957 | Cadillac et al. | 214/505 |
| 2,832,486 | 4/1958 | Clark | 214/506 |
| 2,895,746 | 7/1959 | Swaney | 214/423 (B) |
| 3,406,852 | 10/1968 | Winckler | 214/506 |
| 1,840,705 | 1/1932 | Eichelberger | 214/85 |
| 2,131,949 | 10/1938 | Helmig | 214/85 |

Primary Examiner—Albert J. Makay
Attorney—William P. Hickey

ABSTRACT: A tiltable trailer having a goose neck that is attached to the front end of the bed of a trailer at a point located forwardly and downwardly from the leading edge of the trailer bed. The goose neck abuts the flat bed adjacent its front leading edge, and actuating hydraulic cylinders are housed within the goose neck at generally right angles to the line connecting the hinge and the top portion of the abutment means that is adjacent the leading edge of the bed. Threadways may be provided on opposite sides of the goose neck for supporting the wheels of vehicles on the goose neck portion. The trailer is preferably towed by a flat plate hinged to the front end of the goose neck on a horizontal axis, and the leading edge of which is notched to receive a post projecting vertically from the bed of a flat bed truck. Since only a post projects out of the bed of the truck, the truck can be used for other purposes when the trailer is removed. Landing legs are preferably provided on the goose neck between its hinge, and its abutment with the trailer bed. A winch may also be mounted in the goose neck forwardly of the actuating hydraulic cylinders.

PATENTED AUG 31 1971 3,602,384
SHEET 1 OF 2
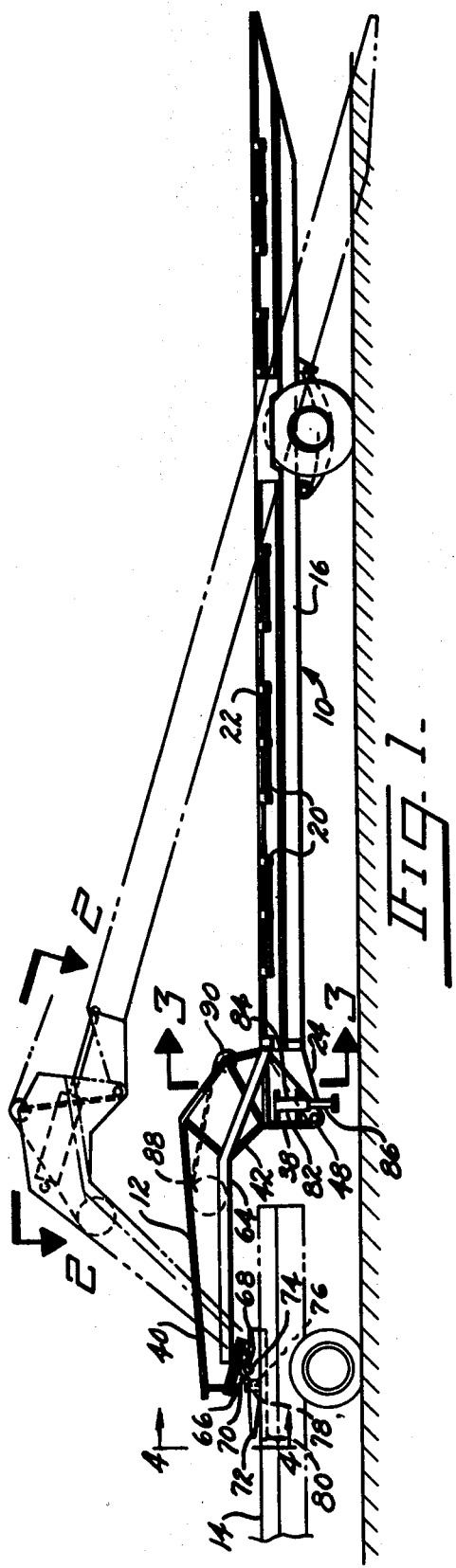
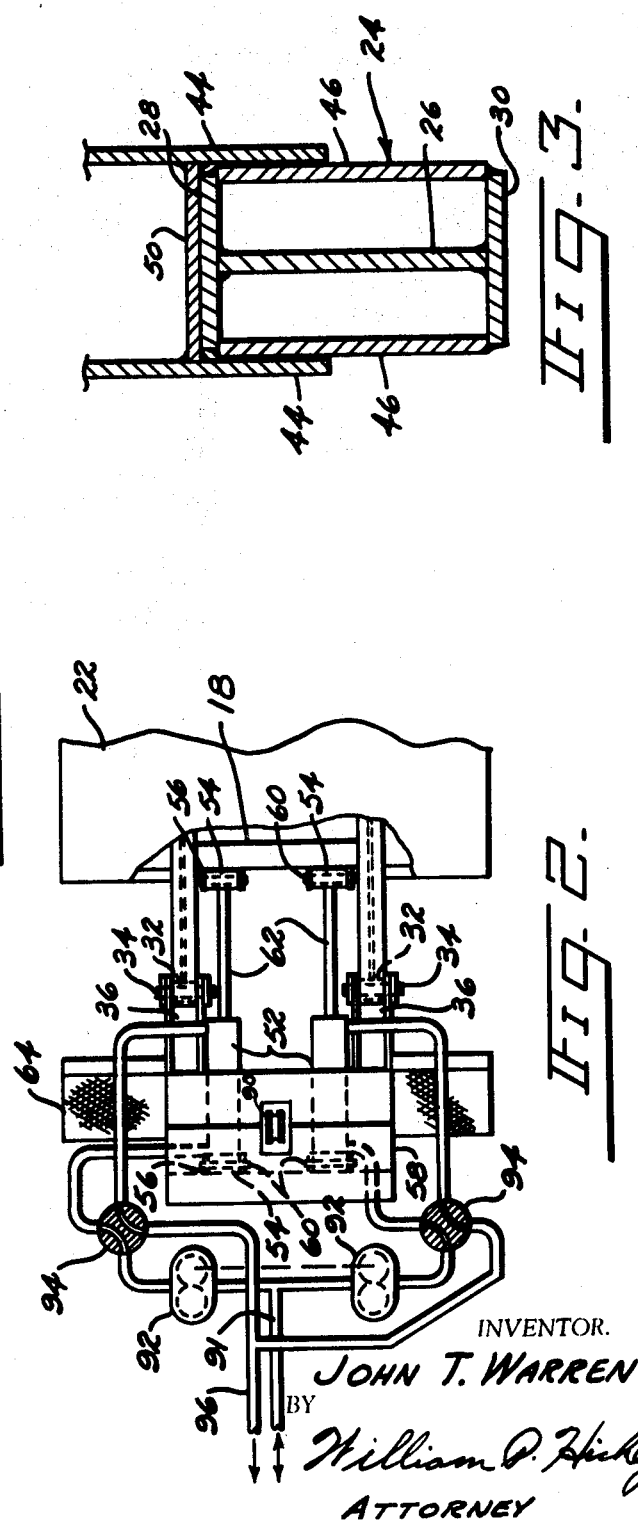
INVENTOR.
JOHN T. WARREN
BY
William P. Hickey
ATTORNEY

TRAINED TRUCK-TILTABLE TRAILER VEHICLE

BACKGROUND OF THE INVENTION

The present invention relates to the truck-trailer vehicles which are used to haul mobile equipment, as for example, tractors, earth movers, combines, etc. The prior art has heretofore provided a tiltable trailer having a hinged frame and which couples to the towing vehicle by means of an elaborate structure that is mounted on the towing vehicle. The installation of the elaborate hitch structure makes the towing vehicle unusable for other purposes. In addition, elaborate structure has been mounted on the trailer bed for opening the hinged frame to tilt the trailer bed for loading and unloading equipment, and only the portion rearwardly of this actuating equipment has been useful for load carrying purposes.

An object of the present invention is the provision of a new and improved tiltable trailer which can be towed by a flat bed truck having only a pin projecting from the bed of the truck, so that the truck can be used for hauling other equipment without elaborate modification or removable of the trailer coupling structure.

Another object of the present invention is the provision of a new and improved tilt bed trailer for hauling mobile equipment that is constructed and arranged so that the gooseneck portion of the trailer can be used to support part of the mobile equipment being hauled.

Further objects and advantages of the invention will become apparent to those skilled in the art to which the invention relates from the following description of the preferred embodiments described with reference to the accompanying drawings.

SUMMARY OF THE INVENTION

According to one aspect of the invention, a trailer for hauling mobile equipment is provided with a generally flat bed portion having a gooseneck attached to the leading edge thereof, by means of a hinge that is located forwardly and downwardly of the leading edge of the flat bed portion. The gooseneck abuts the flat bed at a point adjacent its top leading edge when the hinge joint is closed; and the gooseneck is formed by two generally parallel structural members which are off set vertically by an amount that is just sufficient to clear the bed of a flat bed truck. The truck is provided with a flat plate whose top surface is generally coextensive with the flat bed of the truck and which has an upwardly extending post thereon to pivotally receive the forward end of the gooseneck. The extensible mechanism which opens the hinged joint of the trailer frame is housed between the structural members of the gooseneck, and threadways are attached to opposite sides of the structural members for receiving the wheels of the mobile equipment to be hauled. Where a winch is to be provided, it may be installed between the structural members of the gooseneck forwardly of the extensible mechanism, so that the entire flat bed of the trailer is clear of obstructions, and so that the wheels of mobile equipment may ride up the threadways and straddle the structural members of the gooseneck.

DESCRIPTION OF THE DRAWINGS

FIG. 1 of the drawings is a side elevational view of the truck-trailer vehicle of the present invention, and in which solid lines are used to show the carrying position of the vehicle, and dot-dashed lines are used to show the loading and unloading position of the vehicle:

FIG. 2 is a fragmentary plan view taken approximately on the line 2—2 of FIG. 1, and which further includes a hydraulic actuating circuit shown schematically; and FIG. 3 is a fragmentary cross-sectional view taken approximately on the line 3—3 of FIG. 1.

DESCRIPTION OF THE PREFERRED EMBODIMENTS

Figure 4:
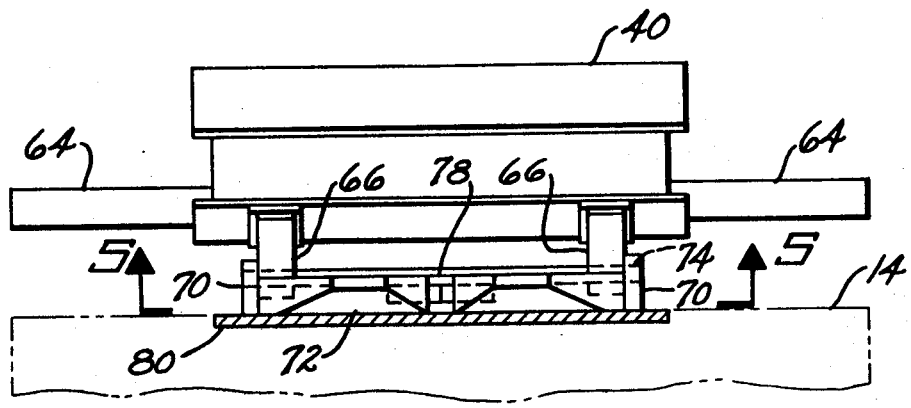
FIG. 4 is a front elevation of the gooseneck coupler taken on the line 4—4 of FIG. 1
Figure 5:
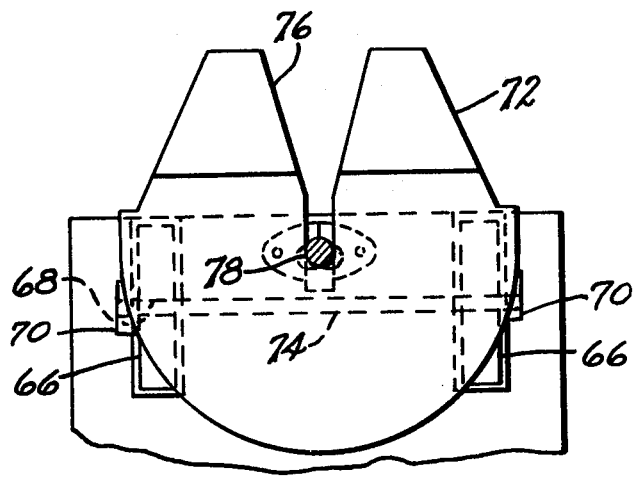
FIG. 5 is a bottom view of the gooseneck coupler taken on the line 5—5 of FIG. 4.

The vehicle shown in the drawings generally comprises, a tiltable trailer having a flat bed portion 10, and a gooseneck portion 12. The trailer is adapted to be towed by a flat bed truck, indicated generally at 14.

The flat bed portion 10 of the trailer, generally comprises, two longitudinal stringers 16 which are made from H beams, and the rear end of which are beveled for ground engagement. The stringers 16 are connected together by horizontal members 18, which are also H beams, and which have their top surface flush with the top surface of the longitudinal stringers. Outriggers 20 are secured to opposite sides of the longitudinal stringers 16, with the top surface of the outriggers also being flush with the top surface of the longitudinal stringers 16. Floor plate 22 is laid over the top surface of the outriggers 20, horizontal members 18, and longitudinal stringers 16 to provide a generally flat bed for carrying mobile equipment, as will later be described. The front end of the longitudinal stringers 16 are provided with a forwardly extending bracket 24, having a center web 26 and top and bottom flanges 28 and 30, which converge toward a horizontal tubular member 32 which forms a journal for a hinge pin 34. The horizontal axis of the tubular member 32 is located forwardly and downwardly from the top leading edge of the flat bed portion 10 at approximately a 45° angle.

The goose neck 12 generally comprises a pair of parallel structural members 36 each having a vertical portion 38, and a forwardly extending horizontal portion 40, which portions are preferably interconnected by a mitered section 42. The structural members are of H cross section of varying depth. The lower forward end of the vertical portions 38 are provided with side plates 44 which fit over side plates 46 on the stringer brackets 24, and which contain aligned openings 48 adjacent their front lower end for receiving the hinge pin 34. An abutment plate 50 is provided between the side plates 44, at least in the area adjacent the front edge of the flat bed portion 10 of the trailer, for abutment with the top flange 28 to limit clockwise movement of the goose neck 12 relative to the flat bed portion 10, as seen in FIG. 1.

A portion of the abutment plate 50 and top flange 28 that are adjacent the front edge of the flat bed portion of the trailer, engage each other to limit the clockwise movement of the goose neck relative to the trailer bed. The imaginary line connecting these portions with the center line of the hinge 48, forms an angle of approximately 45 degrees with the longitudinal stringers 16. Extensible means 52, which in the presence instance is a pair of hydraulic cylinders, is positioned generally at right angles to the imaginary line. The hydraulic cylinders 52 are housed in the goose neck 12 between the structural members 36. The upper end of the cylinders 52 are provided with a transverse pivot tube 54 that is positioned between a pair of ears 56 that are welded to a cross member 58 extending between the structural members 36. The ears 56 have holes therein that are aligned with the central opening of the transverse tube 54, and a pivot pin 60 extends therethrough. In like manner, the end of each piston rod 62 is provided with a transverse pivot tube 54 that is positioned between ears 56 through which a pivot pin 60 extends. These ears 56 are welded to the front cross member 18 of the flat bed portion 10 of the trailer. A pair of threadways 64 are welded to opposite sides of the structural members 36. Each threadway 64 has an inclined portion, beginning at the leading edge of the floor plate 22, which extends forwardly and upwardly across the vertical portion 48, and mitered section 42 of the goose neck, and a horizontal portion which extends forwardly along the bottom edge of the horizontal portions 40 of the structure members 36. The bottom edge of the threadways are generally coextensive with the bottom of the horizontal portions 40. The bottom of the horizontal portions 40, clear the top of the flat bed portion of the truck 14, by a distance sufficient to accommodate the coupling structure about to be described.

The coupling structure which provides the hitch between the trailer and truck portions of the vehicle, generally comprises an inverted V shaped bracket 66 welded to the bottom front end of the goose neck portion 12 between the structural members 36. The bottom of the bracket 66 has a transverse opening 68 therethrough that is positioned between a pair of ears 70 which project upwardly on opposite sides thereof, from the swivel plate 72. A hinge pin 74 extends through the opening in the ears 70, and the opening 68, to provide a hinge structure which allows the goose neck to tilt vertically relative to the truck. The swivel plate 72 has a notch 76 therein extending rearwardly from its front face for receiving a vertical post 78. The post 78 projects upwardly form a bed plate 80 that is affixed to the truck 14 with its surface generally coextensive with the top surface of the bed of the truck. Suitable means is provided for preventing separation of the swivel plate 72 from the post 78, while allowing the swivel plate 78 to rotate about the post 78. The back end of the swivel plate 72 is heavier than the front portion so that it rotates to an inclined position when not resting on the truck. When the truck is backed rearwardly against the swivel plate, the swivel plate is rotated horizontally to properly receive the vertical post 78.

Inasmuch as the coupling structure above described only projects approximately 8 inches below the horizontal portion 40 of the goose neck 12, no more than approximately 8 inches of clearance with respect to the top of the truck bed is required. The threadways 64 that are located on the goose neck 12 are therefore, only approximately 12 inches above the floor plate 22 of the trailer, and the incline of the threadways 64 is, therefore, relatively shallow. The invention allows the wheels of the equipment to straddle the structural member 36 to be laterally restrained thereby. The horizontal axle of the transported equipment also adequately clears the upper most portion of the structural member 36 and the extensible members 52 housed therein. Landing legs 82 are provided to support the front end of the trailer when it is coupled from the truck 14. The landing legs comprise a pair of vertical tubes welded to the trailer and through which posts 86 extend. Horizontal pins, not shown, are inserted through posts 86 to hold them extended. In the preferred construction, the tubes 84 are welded to the structural members 36 so that a mechanical advantage exists by which the extensible means 52 can pick up the rear of the truck to allow its tires to be changed. Also in the preferred embodiment, a winch 88 is positioned between the structural members 36 forwardly of the extensible means 52 so as not to obstruct movement of equipment onto the bed portion of the trailer. This location of the winch 88 has the further advantage that it can be locked against rotation and the extensible means 52 extended to exert an even greater tension on the cable.

FIG. 2 of the drawing also includes a schematic diagram of a hydraulic hook-up for actuating hydraulic cylinders when they are used for the extensible means 52. The hydraulic controls include a high pressure inlet line 91 which extends to opposite sides of a flow divider valve 92. The flow divider valve 92 is shown as two positive displacement gear pumps the shafts of which are connected together, and through which the high pressure fluid passes to respective four way valves 94. Each four way valve 94 has one side port connected to the end of a cylinder 52, and an opposite side port connected to the pressure return line 96. The opposite ends ports of the four way valves 94 are connected to the piston rod end of the cylinders 52. The two valves 94 are mechanically connected so that each cylinder 52 is operated in the same manner. The arrangement is such that the same quantity of high pressure fluid flows to each cylinder regardless of the load distribution on the trailer.

The operation of the trailer will be apparent from the above description of the various parts. The pressure from the high pressure line 91 when delivered to the upper end of the cylinders 54 caused the piston rods 62 to be extended, and the goose neck 12 rotated about the hinge 48. This tilts the bed portion of the trailer into its inclined position as shown by the dot-dash lines in FIG. 1. Normally the tilting action of the trailer is stopped when its rear end just engages the ground. In this position, the equipment to be transported by the trailer is rolled onto the flat bed portion of the trailer by its own motive power or by operation of the winch 88. It will be apparent that further extension of the piston rods 62 will thereafter move the wheels of the trailer out of the ground engagement, so that its tires can be changed. When the equipment is on the flat bed portion of the trailer, the piston rods 62 are retracted, and the hinge of the trailer moved to bring the abutment plate 50 into engagement with top flange 28 of the bracket 24. Thereafter the vehicle on the flat bed portion of the trailer can be moved forwardly up the threadways 64, so that the weight of the loaded vehicle holds the hinge closed without the necessity of holding positive pressure on the cylinders 52 while the vehicle is underway.

While the invention has been described in considerable detail, I do not wish to be limited to the particular embodiments shown and described, and it is my intention to cover hereby all novel adaptions, modifications, and arrangements thereof which come within the practice of those skilled in the art to which the invention relates.

I claim:

1. A tiltable trailer comprising: a trailer bed having two parallel spaced apart longitudinal stringers and a deck thereon, a gooseneck having two parallel structural members generally in line with said stringers, said structural members having a generally vertical portion adjacent the front of said trailer bed and a generally horizontal portion at the top of said vertical portion hinge means between said gooseneck and said trailer bed for lowering the front of said gooseneck relative to said trailer bed, abutment means positioned between said structural members and the front of said trailer bed in line with said stringers for limiting upward rotation of the front of said gooseneck relative to said trailer bed, extensible means with one end of said extensible means being pivotally connected to said trailer bed and the other end of said extensible means being pivotally connected to said gooseneck for producing rotation of said gooseneck relative to said trailer bed about said hinge means, a horizontal bearing plate the bottom surface of which is adapted to rotatably slide upon a flat plate of a towing vehicle, means pivotally attaching the front end of said gooseneck to said horizontal bearing plate about a horizontal axis, and threadways fixed to opposite sides of said structural members with their side edges generally in line with the side edges of said trailer bed and with the rear edges of said threadways abutting said trailer bed in the horizontal position of said gooseneck, said threadways extending forwardly from said deck across said vertical portions and along said horizontal portions of said structural members.

2. The tiltable trailer of claim 1, wherein the portion of said bearing plate rearwardly of said horizontal axis is heavier than the portion forwardly of said horizontal axis so that its forward edge tilts upwardly when unrestrained, and said plate having a forwardly extending notch adapted to receive a vertical post on a towing vehicle.

3. The tiltable trailer of claim 1 wherein said extensible means comprises a pair of hydraulic cylinders, and flow dividing means for proportioning the flow of pressure fluid between the cylinders regardless of back pressure.

4. The tiltable trailer of claim 3 wherein said hydraulic cylinders are double action and including: a landing leg on each structural member of said goose neck, said landing legs being positioned intermediate said hinges means and said abutment means.

5. A tiltable trailer comprising: a trailer bed having two parallel spaced apart longitudinal stringers and a deck thereon, a gooseneck having two parallel structural members each having a vertical portion positioned forwardly of a stringer, a forwardly extending generally horizontal portion positioned above said stringer, and an interconnecting portion having an inclined top surface which begins generally at the top surface of said stringer, hinge means pivotally connecting each vertical portion to the front lower end of a respective stringer, and an abutment surface on said stringers for preventing downward rotation of said forwardly extending portion of said goose neck about said hinge means beyond a generally horizontal position, said abutment surface lying generally beneath the top surface of said longitudinally extending stringers for engagement with the vertical portions of respective structural members of said goose neck and being positioned upwardly and rearwardly at an acute angle from said hinge means.

6. The tiltable trailer of claim 5 wherein said hinge means comprise: a bracket on the forward end of each trailer stringer, said brackets extending forwardly and downwardly and having vertical opposing sides, said longitudinal members of said goose neck being pinned to the front lower end of said brackets beneath the bottom of said stringers and having opposing vertical plates which engage said vertical opposing sides of said brackets when said hinge means is closed.

7. The tiltable trailer of claim 6 including landing legs secured to said vertical plates.